United States Patent

[11] 3,568,181

| [72] | Inventor | John H. Weaver<br>Encino, Calif. |
|------|----------|------------------------------|
| [21] | Appl. No. | 744,529 |
| [22] | Filed | July 12, 1968 |
| [45] | Patented | Mar. 2, 1971 |
| [73] | Assignee | Anadex Instruments, Inc. |

[54] SYSTEM FOR LINEARIZING A NONLINEAR CONTINUOUS FUNCTION BY VARIABLE TIME SAMPLING
5 Claims, 6 Drawing Figs.

| [52] | U.S. Cl. | 340/347 |
|------|----------|---------|
| [51] | Int. Cl. | H03k 13/00 |
| [50] | Field of Search | 340/347 |

[56] References Cited
UNITED STATES PATENTS

| 3,349,390 | 10/1967 | Glassman | 340/347 |
| 3,351,932 | 11/1967 | Hibbits | 340/347 |
| 3,294,958 | 12/1966 | DuVall | 340/347 |
| 3,201,781 | 8/1965 | Holland | 340/347 |

Primary Examiner—Maynard R. Wilbur
Assistant Examiner—Jeremiah Glassman
Attorney—Fowler, Knobbe and Martens ABSTRACT: A voltage representing a point on a nonlinear continuous curve having a known characteristic shape is converted to a periodic function having a frequency determined by the magnitude of the input voltage. A gating means is enabled by a variable time base generating means and applies the periodic function to a counting means for a sample time determined by the frequency of the periodic function, the accumulated count in the counting means, and the characteristic shape of the voltage curve. When the gating means is disabled at the end of the sample time, the counting means contains a value representing the magnitude of the input voltage.

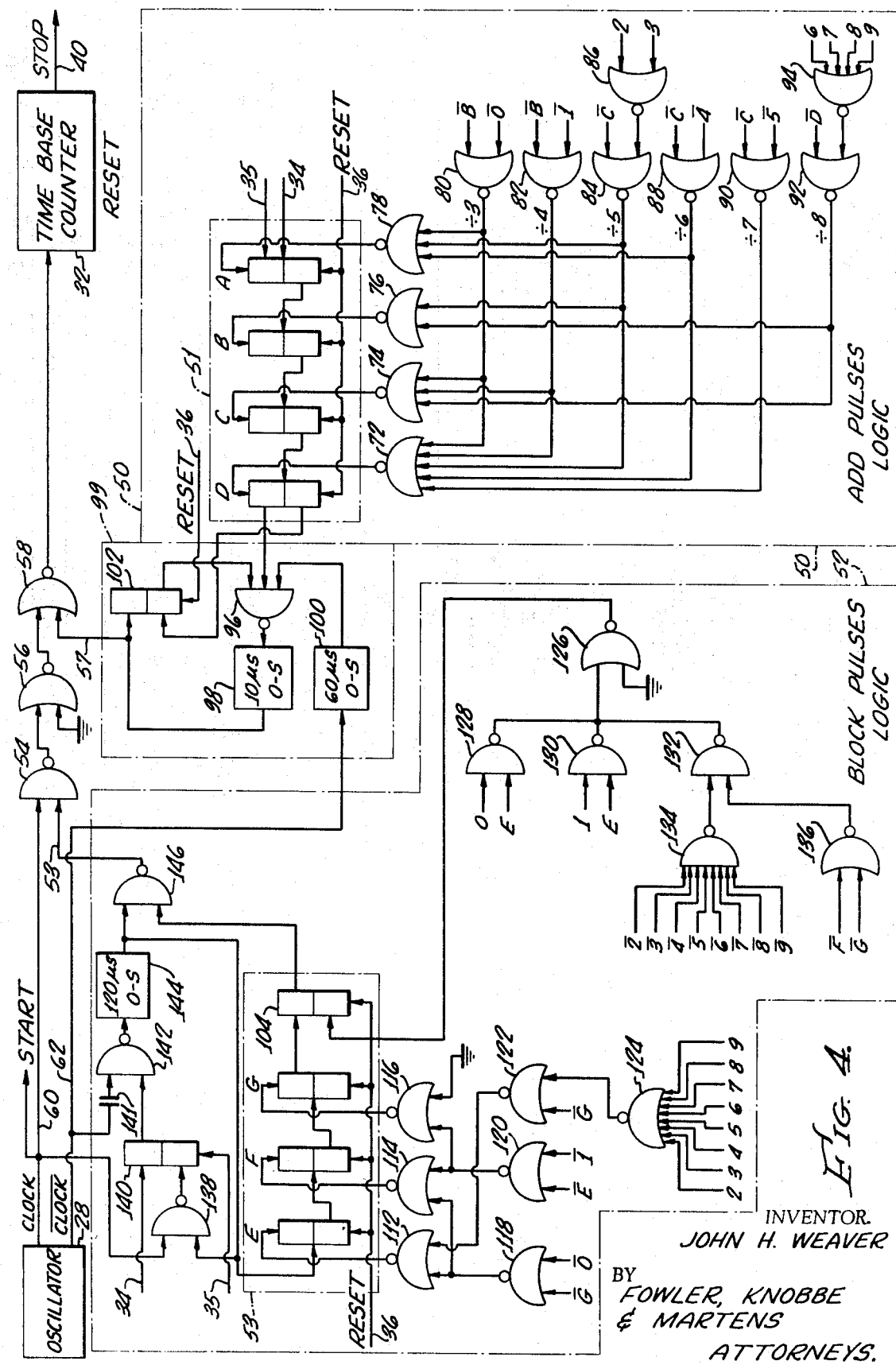

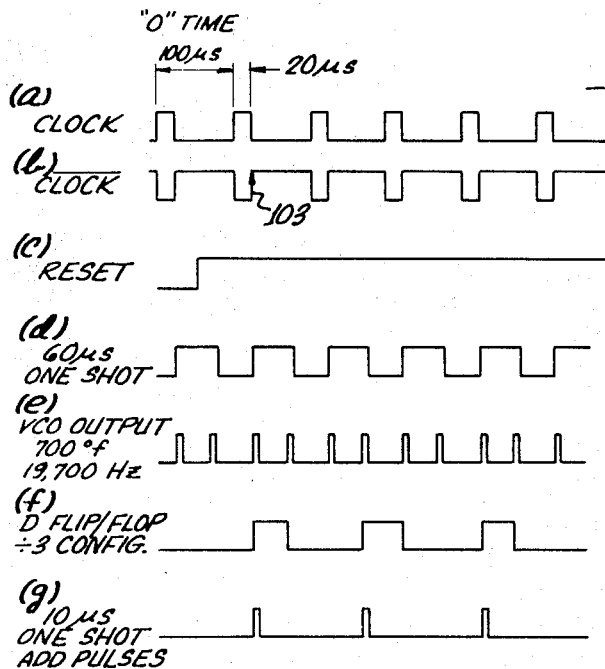
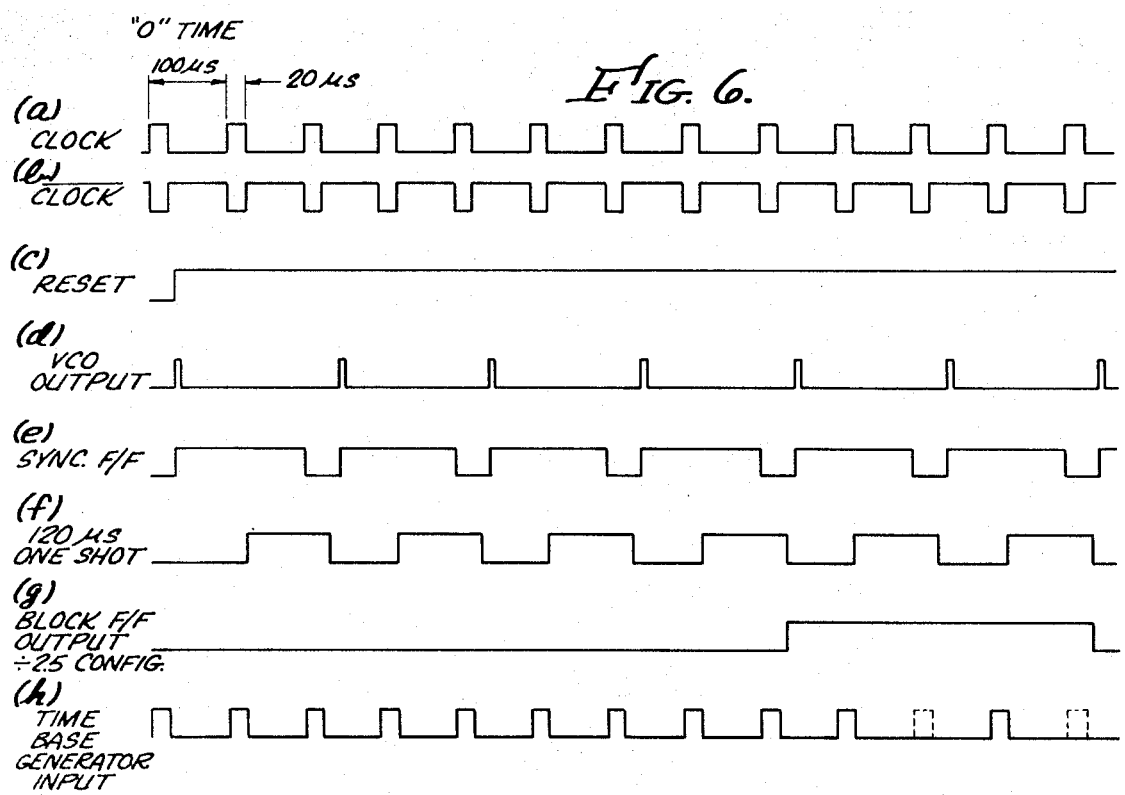

SYSTEM FOR LINEARIZING A NONLINEAR CONTINUOUS FUNCTION BY VARIABLE TIME SAMPLING

BACKGROUND OF THE INVENTION

1. Field of the Invention

The present invention relates to analog-to-digital converting apparatus and more particularly, to a device for converting an analogue signal having a known nonlinear characteristic, such as the output voltage of a thermocouple, to a digital representation.

2. Description of the Prior Art

In data acquisition systems where it is desired that a measured variable be read out or recorded, the variable is usually converted to an analogous function which may then be digitized and read out by an analog-to-digital converter (ADC). For example, in a system where a varying temperature is to be read out, a thermocouple translates the temperature to an analogue voltage which is then converted to a digital value corresponding to the temperature by an ADC which has a transfer function that is the inverse of the thermocouple. So long as the transfer function of the thermocouple is linear, that is the voltage output of the thermocouple is always equal to a constant times the measured temperature, the design of the ADC is relatively simple. One such device comprises a voltage controlled oscillator (VC0) which converts the analogue voltage to a frequency function which is gated into a counting means. The gating time is selected to be proportional to the slope of the transfer function of the thermocouple. When the transfer function of the thermocouple is linear, the gating time is always constant.

If, however, the transfer function of the thermocouple is nonlinear, that is the thermocouple analogue voltage output does not vary linearly with respect to the temperature, the design of the ADC becomes considerably more complex. In the prior art, the mechanization of such an ADC usually requires an analogue servoloop comprising an indicating device which is driven by the analogue voltage output of the thermocouple. The indicating device has an elaborate decoding means and function generator associated with it which generates a feedback signal to the input of the indicating device to null out the input voltage. This type of ADC is quite expensive due to its complexity and tolerance requirements and is also relatively slow due to the response time of the indicating device and the damping required in the servoloop to prevent overshoot and oscillation.

SUMMARY OF THE INVENTION

The present invention digitizes a smooth, nonlinear function by converting a voltage input, which represents a point on the characteristic curve of the function, to a periodic function by means of a voltage controlled oscillator (VCO). The output of the VCO has a frequency determined by the magnitude of the input function. A gating means is enabled by a variable time base generating means and applies the VCO output to a counting means which integrates it, that is counts the periodic output of the VCO, until the gating means is disabled. The variable time base generating means is responsive to the frequency of the VCO output and to the accumulated count in the counting means and enables the gating means for a predetermined sample time. The counting means will contain a value representing the magnitude of the input voltage at the end of the sample time.

The variable time base generating means includes a fixed frequency oscillator having an output which is gated through linearization logic into a time base counting means. The time base counting means has a fixed count capacity and will generate a signal terminating the sample time when it reaches its count capacity. The linearization logic comprises block pulses logic means which will block the fixed frequency oscillator inputs into the time base counting means to extend the sample time, and add pulses logic means which will add additional pulses to the input of the time base counting means to shorten the sample time. The blocking and addition of pulses into the time base counting means occurs as a function of the frequency of the VCO output, the accumulated count in the counting means, and the characteristic shape of the input voltage curve.

As a result of the digital mechanization provided by the present invention, the value of a nonlinear analogue function may be rapidly digitized since the analogue servoloop of the prior art with its attendant damping requirements is eliminated.

The device of the present invention is also less expensive than the analogue apparatus of the prior art since it may be constructed with inexpensive microelectronic logic chips. This solid-state construction is inherently more reliable than the prior art apparatus, thus reducing maintenance requirements. It also requires less power to operate and may be packaged in a much smaller container.

BRIEF DESCRIPTION OF THE DRAWINGS

FIG. 4 is a schematic diagram of the linearization logic shown in FIG. 1;

FIG. 5 and FIG. 6 are signal timing diagrams for selected points in the schematic of FIG. 4.

DESCRIPTION OF THE PREFERRED EMBODIMENT

Figure 1:
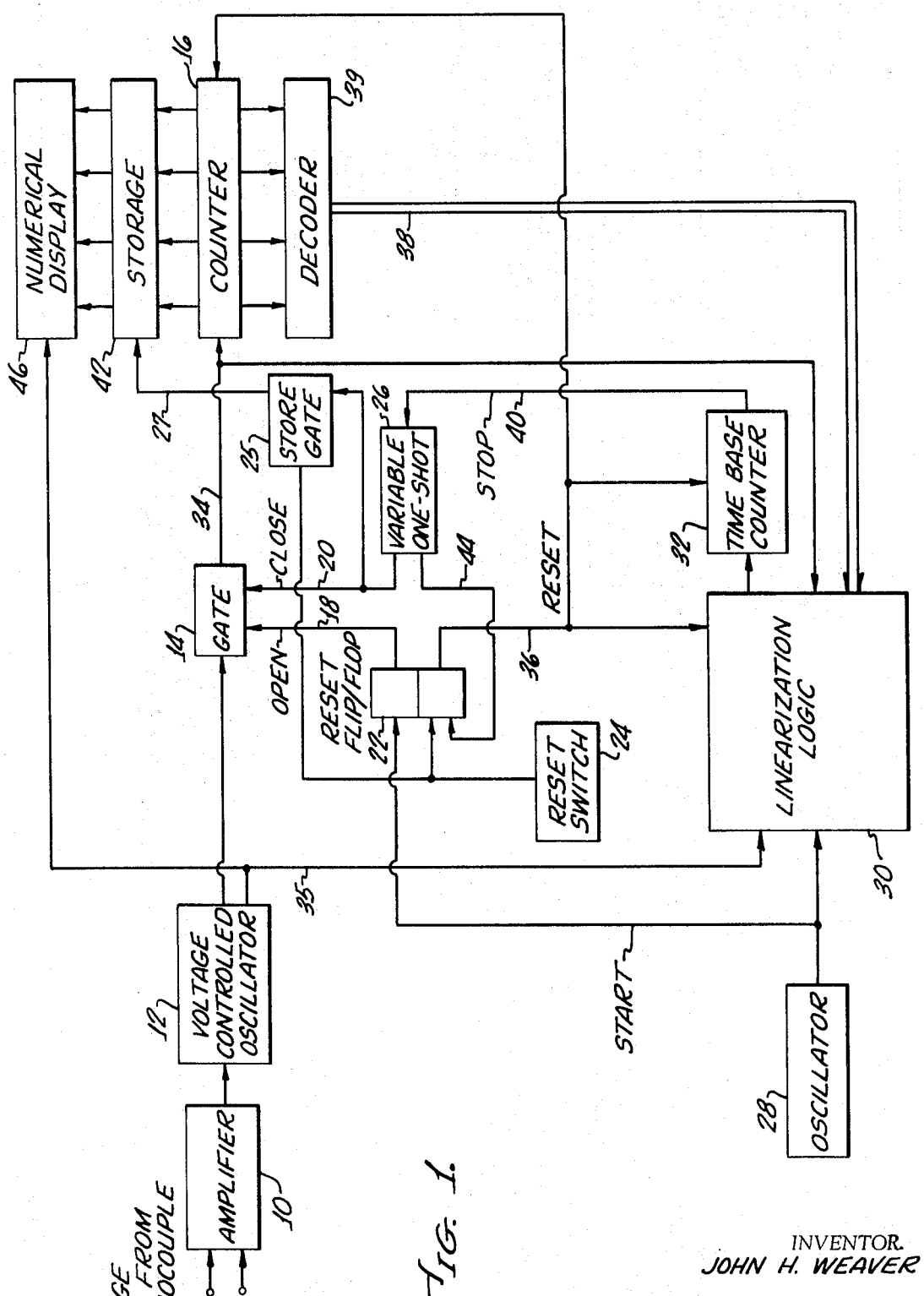
FIG. 1 is a system diagram of the preferred embodiment of the present invention.

A system diagram of the preferred embodiment of the present invention is shown in FIG. 1 of the drawings. An input voltage, such as a thermocouple output having a known voltage-to-temperature characteristic curve, is amplified by an amplifier 10 and applied to a voltage-controlled oscillator (VCO) 12. The VCO 12 converts the voltage input to a periodic function having a frequency determined by the magnitude of the input voltage.

The output of the VCO 12 is gated by the gating means 14 as an input to a counting means 16 on line 34. The counting means 16 will count, that is, integrate, the cyclic output of the VCO 12 so long as the gating means 14 is enabled.

Advantageously, the counting means 16 comprises a series of interconnected decade counters which are well known in the art and accordingly are not shown in detail. In the particular mechanization described herein, the counting means 16 includes four decade counters providing a count capacity of 9,999 counts. A decoding means 39 decodes the accumulated count in the counting means 16 and generates status signals on a plurality of lines represented by cable 38.

The gating means 14 is enabled by an open signal on line 18 and is disabled by a close signal on line 20. The enabling and disabling signals appearing on lines 18 and 20, respectively, are generated by a variable time base generating means which includes reset flip-flop 22, reset switch 24, a variable one-shot 26, fixed frequency oscillator 28, linearization logic 30 and time base counter 32. This variable time base generating means responds to a first input comprising the frequency of the output of VCO 12, appearing on line 34, and a second input comprising the accumulated count in counting means 16, indicated by signals appearing on cable 38, and varies the period of time during which gating means 14 is enabled as a function of these inputs. When the gating means 14 is disabled by the variable time base generating means, the contents of the counting means 16 is shifted into a storage means 42. A numerical display means 46 then displays the value contained in the storage means 42 which is a digital representation of the magnitude of the voltage input to the system.

The preferred embodiment of the present invention will be set to an initial condition by the actuation of reset switch 24. The actuation of the reset switch 24 will reset the reset flip-flop 22 to a false state. The false output of flip-flop 22 on line 36 will initialize the various counters and flip-flops contained in the linearization logic 30, and will set the time base counter 32 and the counting means 16 to a zero count. The output of the reset switch 24 is also an input to a store gate 25 which will generate a signal on line 27 to the storage means 42. The signal on line 27 will shift the count contained in the counting means 16 into the storage means 42. Since the counting means 16 was set to a zero count when the reset flip-flop 22 was reset, a zero count will be shifted into the storage means 42 when the system is initialized.

The flip-flop 22 will be set true by the first cycle of the oscillator 28 output immediately after the flip-flop 22 is reset by the reset switch 24. The true output of binary 22 is the open signal on line 18 to gating means 14 and allows the output of VCO 12 to be applied to counting means 16.

The output of the oscillator 28 is also an input to linearization logic 30 which gates it as an input to time base counter 32. In the particular embodiment illustrated herein, the oscillator 28 has a frequency of 10 kHz.

The time base counter 32 comprises a binary counter having a predetermined count capacity. When the counter 32 reaches this count capacity, a stop signal is generated on line 40 as an input to one-shot 26. The stop signal on line 40 sets one-shot 26 true, for a predetermined period of time, generating the close signal to gating means 14 on line 20. When the one-shot 26 returns to its normal state, a signal is generated on line 44 which resets the flip-flop 22. Accordingly, when time base counter 32 reaches its count capacity and generates the stop signal on line 40 setting the output of one-shot 26 true, the gating means 14 will remove the output of VCO 12 from the input to the counting means 16. When the output of one-shot 26 returns to its normal state the flip-flop 22 will reset which in turn will initialize the system in preparation for a subsequent sampling process.

The close signal on line 20 from the one-shot 26 is also an input to the store gate 25. The store gate 25 will generate a signal to line 27 to the storage means 42 when the one-shot 26 is set true causing the count in the counting means 16 to be shifted into storage means 42 for display purposes.

The storage means 42 includes gating logic and a storage register having the same capacity as counting means 16. The signal on line 27 from the storage gate 25 will cause the count contained in the counting means 16 to be shifted through the gating logic contained in the storage means 42 and stored in the register. The numerical display means 46 displays the count contained in the register in the storage means 42 as degrees Farenheit having three significant digits. For example, 5,000 counts accumulated in the counting means 16 will be displayed as 500.0° F.

In summary, the VCO 12 converts the thermocouple voltage input to a frequency which is applied as an input to the counting means 16 when the gating means 14 is enabled. The gating means 14 is enabled when the reset flip-flop 22 is one-set by oscillator 28 and disabled when time base counter 32 generates a signal on line 40 setting one-shot 26 which generates a close signal on line 20. The output from one-shot 26 also shifts the contents of counting means 16 into storage means 42 to be displayed by numerical display means 46.

The gating means 14 will be disabled as long as the variable one-shot 26 is set. Once the one-shot 26 returns to its normal state, a signal on line 44 resets the flip-flop 22 resulting in a rest signal on line 36 to initialize the linearization logic 30, counter 32 and counting means 16 for the next sample time. The next sample time is initiated when the next cycle of the oscillator 28 output sets flip-flop 22.

It can be seen that the interval between sample times is determined by the period of time for which the one-shot 26 is set. Advantageously, the period of the one-shot 26 is variable by an operator of the present invention to provide sufficient time between sample times to allow manual recording or visual observation of the value displayed by display means 46.

The oscillator 28, linearization logic 30 and time base counter 32 determine the period of time during which the gating means 14 is enabled. Linearization logic 30 gates the output of oscillator 28 to the input of counter 32. In addition, logic 30 will add extra pulses to the input of counter 32 or will prevent pulses from oscillator 28 from entering counter 32. It can be seen that if pulses are added to counter 32, the period of time during which gating means 14 is enabled will be decreased, since the predetermined capacity in counter 32 will be reached sooner than if only the output of oscillator 28 were applied to counter 32. And, conversely, if linearization logic 30 blocks input pulses to counter 32 from oscillator 28, the period of time during which gating means 14 is enabled will be increased due to the increased time required for counter 32 to reach its count capacity.

To digitize the magnitude of an input to the system of FIG. 1, the variable time base generating means and in particular the logic mechanization of linearization logic 30 is preset in accordance with the known nonlinear curve characteristic of the input to provide an appropriate sample time.

Figure 2:
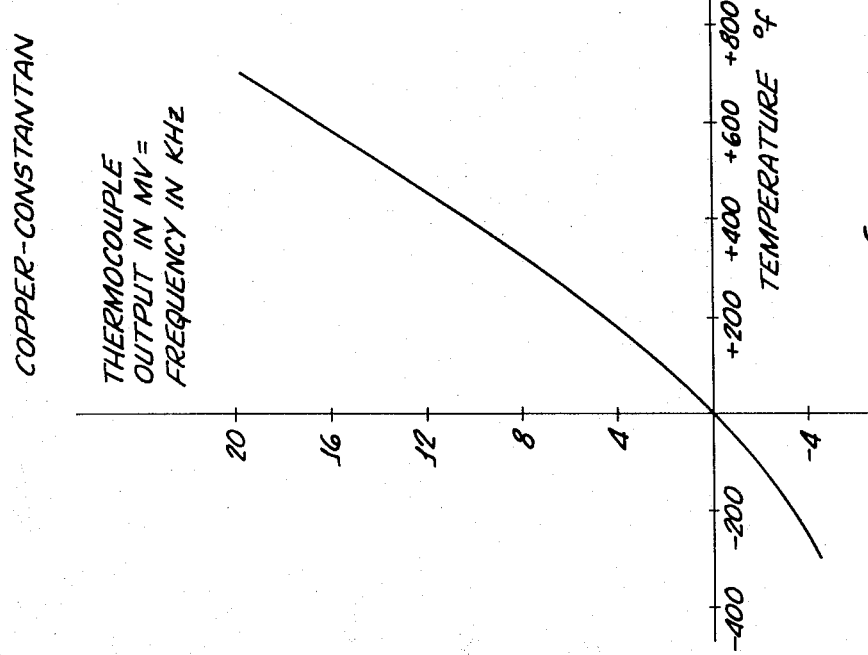
FIG. 2 is a graph of the characteristic curve of a copper constantan thermocouple.

By way of specific example, assume that the input to the system is the voltage output of a copper-constantan thermocouple having a voltage output with respect to temperature sensed characteristic curve as shown in FIG. 2. The thermocouple output is compensated for zero volts out for zero degrees temperature, as seen in FIG. 2, in a manner well known in the art. The thermocouple input to the system is amplified by amplifier 10 and converted to a frequency by VCO 12. VCO 12 is advantageously adjusted for a linear relationship between millivolt input from the thermocouple and frequency output from VCO 12. For example, as shown in FIG. 2, at 100.0° F., the input voltage from a copper-constantan thermocouple is approximately 2.187 millivolts (mv.). The output of oscillator 12, therefore, will be approximately 2.187 kilohertz (kHz.). The thermocouple input at 200.0° F. will be 4.637 mv. and the output from VCO 12 will be 4.637 kHz.

Accordingly, it can be seen that if gating means 14 is enabled for .4572 seconds when the thermocouple input to the system is 2.187 mv. counting means 16 will accumulate 1,000 counts. Display means 46 will display this value at 100.0° F. as previously discussed. If the gating means 14 is enabled for .4314 seconds when the thermocouple input to the system is 4.637 mv., counting means 16 will accumulate 2,000 counts for a displayed value of 200.0° F., thereby achieving the desired linearization at this temperature value.

In appendix I, there is shown in chart form the relationship between the temperature sensed by the thermocouple, column A, and the corresponding voltage output of the thermocouple, column B. The sample times in column C represent the time required for counting means 16 to count to a value corresponding to the temperatures in column A. The significance of the values in columns D and E will be discussed hereinafter.

Figure 3:
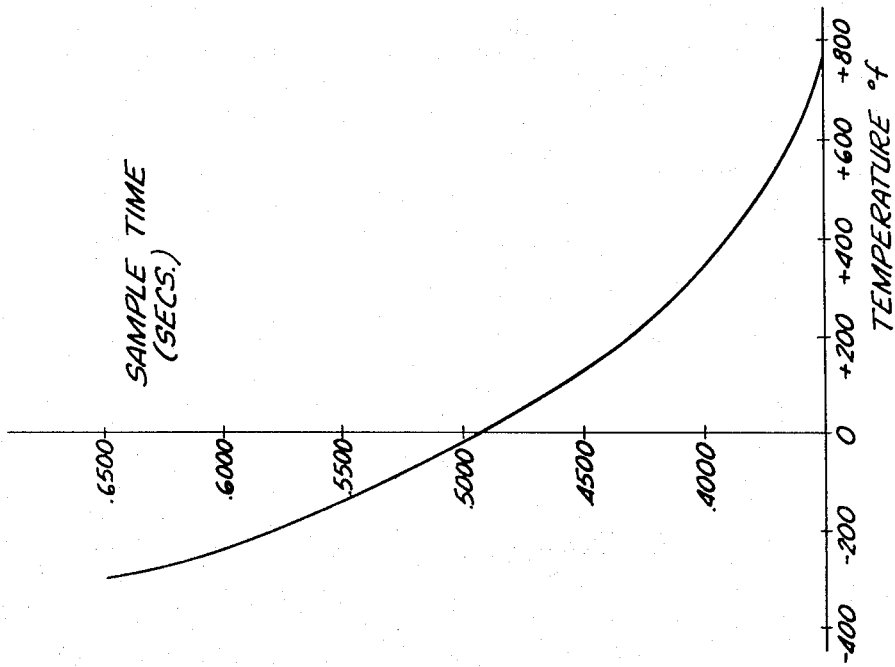
FIG. 3 is a graph of sample time with respect to the environmental temperature of a copper constantan thermocouple.

Referring now to FIG. 3, there is shown a graph of the sample times listed in appendix I, plotted as a function of the temperature sensed by the thermocouple. Note that at −300.0° F. a sample time of .6501 seconds is required, at 000.0° F. the curve crosses the sample time axis at .4897 seconds, and that at 700.0° F. a sample time of .3540 seconds is necessary.

Referring now to FIG. 2, it will be noted that for increasing positive temperatures for the thermocouple environment, the frequency output of VCO 12 is increasing positively. For increasing negative temperatures, the frequency output of oscillator 12 is increasing negatively. Accordingly, to simplify the design of the system, the counting means 16 is set to a zero count condition when the system is initialized and the frequency output from the VCO 12 will advance the counting means 16 whether the temperature is positive or negative. The sign of the temperature sensed by the thermocouple is indicated in the display means 46 by a signal output from the VCO 12 on line 35. The signal on line 35 is also an input to the linearization logic 30.

A base sample time, that is the time required for time base counter 32 to reach its count capacity by counting only the output of oscillator 28, is selected so that the stop signal on line 40 is generated after a period of time has elapsed corresponding to the zero crossover point of the sample time versus temperature curve shown in FIG. 3. That is, for 000.0° F. sensed by the thermocouple, the gating means 14 will be enabled for .4897 seconds. (Note, however, that since the thermocouple output is compensated for 0 volts output for 0° F. the oscillator 12 output is 0 kHz. so that the counting means 16 will remain unchanged even though gating means 14 is enabled).

By referring to FIG. 3 it can be seen that if a base sample time corresponding to the zero crossover point is selected the linearization logic 30 must decrease the sample time for positive temperatures and must increase the sample time for negative temperatures. Therefore, for a positive sensed temperature, linearization logic 30 will add extra pulses to time base counter 32 to decrease the sample time. For negative sensed temperatures, the clock pulse inputs from oscillator 28 to time base counter 32 will be blocked by the linearization logic 30 to increase the sample time.

In accordance with the present invention, the curve of FIG. 3 is approximated by subdividing it into a plurality of segments which may be assumed to be linear. For example, 100.0° F. increments are used in the embodiment described herein. During each such increment, a predetermined constant rate of sample time change is accomplished by blocking or adding pulses to the counter 32 at a constant rate during that segment. The rate at which linearization logic 30 blocks or adds pulses during a segment is determined by the slope of that segment.

In appendix I, it will be noted that the sample time change between 0.000.0° F. and 100.0° F. is .0325 seconds and that the sample time change between 100.0° F. and 200.0° F. is .0258 seconds. Similar calculations can be made for each 100.0° F. increment in temperature.

For further illustration of the operation of the embodiment shown in FIG. 1, assume that the thermocouple environmental temperature is 200.0° F. The VCO 12 output frequency for this condition is 4.637 kHz. requiring a .4314 second sample time for displaying 200.0° F. on the numerical display 46. Thus, if the selected base sample time of .4897 seconds is decreased .0325 seconds for the first 1,000 counts accumulated in counting means 16 and decreased .0258 seconds for the second 1,000 counts accumulated in the counting means 16, the gating means 14 will be disabled after .4314 seconds and the count accumulated in the counting means 16 during that .4314 second time period will be 2,000 counts. A count of 2,000 in counting means 16 will be displayed as 200.0° F. In this manner, the thermocouple input temperature curve is linearized.

To implement the above example, the linearization logic 30 divides the 4.637 kHz. output of the VCO 12, appearing on line 34, by a constant during the first 1,000 counts accumulated by counting means 16, and adds these pulses to counter 32. This constant divisor is selected by determining what whole integer divided in 1,000 will provide the closest number of pulses required. That is, the sample time should be reduced .0325 seconds during the first 1,000 counts of counting means 16. Since oscillator 28 has a frequency of 10 kHz. each pulse input to counter 32 has a time weight of .0001 seconds. Accordingly, to reduce the sample time .0325 seconds, 325 extra pulses should be added into counter 32. It is apparent then that 3 is the whole integer divisor which will provide the closest number of pulses, in this case 333. if If the VCO 12 frequency is divided by 3, then, the sample time will be reduced by .0333 seconds during the accumulation of the first 1,000 pulses.

During the accumulation of the second 1,000 pulses by counting means 16, the linearization logic 30 should reduce the sample time .0258 seconds. If the signal on line 34 is divided by 4 during this time and the resulting 250 pulses added into counter 32, the sample time will then be reduced by .0250 seconds.

The total number of pulses added into counter 32, in this example, will be 333 + 250 or 583 pulses for a .0583 second reduction of the .4897 base sample time. A simple calculation will show that if gating means 14 is enabled for a sample time of .4897−.0583, or .4314 seconds, the counting means 16 will accumulate 2,000 pulses for a displayed temperature of 200.0° F.

Referring again to appendix I, column D lists the actual sample times achieved by the linearization logic 30. For example, between 0° and 100°the sample time is actually reduced .0333 seconds, etc. Next to each sample time in column D, an integer is shown in parentheses. This is the number utilized by the linearization logic 30 in dividing the output of oscillator 12, as described above, to achieve the reduction in sample time.

By way of further explanation of the operation of the system, assume that the thermocouple input to the system is negative. The linearization logic 30 then will increase the sample time by blocking pulse inputs to the counter 32 from oscillator 28. As shown in appendix I, the sample time is increased .0397 seconds for the temperature interval from 0° F. to −100° F. That is, the sample time for a negative temperature is increased .0397 seconds during the first 1,000 pulses accumulated in counting means 16. The base sample time is increased .0515 seconds for the second 1,000 pulses accumulated by counting means 16 corresponding to the −100° F. to −200° F. temperature interval.

The extension in the base sample time for a negative input to the system is advantageously implemented in the linearization logic 30 during the first 1,000 pulses accumulated by the counting means 16 by blocking two clock pulses from oscillator 28 into counter 32 for each five count pulse inputs to the counting means 16. During this interval then a total of 400 clock pulses from oscillator 28 are blocked increasing the sample time .0400 seconds. In a like manner, the base sample time is increased .0500 seconds during the second 1,000 pulses accumulated by the counting means 16 by the linearization logic 30 blocking one clock pulse from the oscillator 28 to the counter 32 for every two count pulse inputs to the counting means 16. And, for the third 1,000 pulses accumulated by counting means 16, the linearization logic 30 will increase the sample time .0710 seconds by blocking five pulse inputs to counter 32 for each seven pulse inputs to the counting means 16. If the VCO 12, then, has an output of −4.614 kHz. corresponding to an environmental temperature for the thermocouple of −300.0° F., the gating means 14 will be enabled for a time equal to .4897 + .0400 + .0500 + .0710, or .6507 seconds. During this time, counting means 16 will accumulate 3,002 counts for a displayed temperature of −300.2° F.

In appendix I, column D, the actual sample times mechanized by linearization logic 30 for negative voltage inputs to the system are shown. The fractions in parentheses next to each sample time comprise a numerator which represents the number of pulses from oscillator 28 which will be blocked from entering the counter 32 for a predetermined number of pulses, shown as the denominator, which one counted into the counting means 16. The values shown in column E represent the displayed temperature for the corresponding temperature inputs in column A.

The specific 100.0° F. increments utilized in the embodiment described herein are, of course, a matter of choice since a broader increment would simplify the circuitry within the linearization logic 30 while reducing the resolution provided by the system, whereas a narrower increment would increase the complexity of the linearization logic 30 while providing greater resolution.

Further, it will be apparent that comparable approximations are similarly provided by this invention for digitizing other nonlinear functions such as are characteristic, for example, of the chromel-alumel thermocouple and the iron-constantan thermocouple. Further examples of transducers producing a nonlinear output signal readily digitized by this invention are strain gauges and resistance thermometers.

The mechanization of linearization logic 30 for linearizing the copper-constantan thermocouple input to the system is shown in FIG. 4.

The linearization logic 30 includes an add pulses logic means 50, a block pulses logic means 52 and a gating means including NAND gate 54 and NOR gates 56 and 58.

The logic circuitry shown in FIG. 4 utilizes positive-true logic. Accordingly, a NAND gate, such as gate 54 will generate a true output, a positive voltage, when any one of its inputs is false and will generate a false output when all of its inputs are true. Conversely, a NOR gate, such as gate 56, will generate a true output when all of its inputs are false and will generate a false output when any one of its inputs is true.

The oscillator 28 generates a clock signal output on line 60 and the inverse signal, clock, on line 62. These signals may be seen in FIGS. 5a and 5b and FIGS. 6a and 6b. The clock signal on line 60 is an input to gate 54. A second input to gate 54 appears on line 53 as an output from NAND gate 146. The signal on line 53 will be true at all times except when the block pulses logic 52 has determined that a clock pulse from oscillator 28 should not be allowed to be counted in time base counter 32 during a negative voltage input to the system, as will be discussed hereinafter. Accordingly, gate 54 will have a false output for each clock pulse input from the oscillator 28.

The output of gate 54 is an input to the NOR gate 56 which has a second input which is false at all times since it is connected to ground. The output of the NOR gate 56 then will be true each time the clock pulse on line 60 causes the output of the NAND gate 54 to become false.

The gate 56 is an input to the NOR gate 58 which will generate a false output each time the output from the gate 56 becomes true. The time base counting means 32 responds to a false output from the gate 58 and advances one count configuration.

The time base counting means 32 comprises a series of binaries interconnected as a binary counter having a predetermined count capacity determined by the frequency of oscillator 28 and the time base selected. For example, to generate a .4897 second time base with the oscillator 28 having a frequency of 10 kHz., counter 32 must have a capacity to count to 4,897. Accordingly, counter 32 requires 13 binaries. Twelve binaries would allow counter 32 to count 4,096. Thirteen binaries would allow a count capacity of 8,192. By interconnecting the binaries in a manner well known in the art, a 13-binary counter can be modified to count to 4,897.

As previously discussed, the selected sample time base is decreased by adding extra pulses into the time base counter 32 decreasing the time required for the counter 32 to reach its predetermined count capacity. The sample time base is extended by blocking the pulses which would normally advance the time base counter 32.

The add pulses logic 50 is responsive to the instantaneous count contained in the counting means 16, as indicated by the status signals on cable 38, and to the frequency output of the VCO 12 appearing on line 34. For predetermined count values contained in counting means 16, the logic means 50 will add pulses through the NOR gate 58 into the time base counter 32 at a rate determined by the frequency of the output of the VCO 12.

The add pulses output from the add logic 50 appear on line 57 as an input to the NOR gate 58. When the signal on line 57 becomes true, the output of NOR gate 58 will become false resulting in the counter 32 advancing one count configuration.

Because the logic means 50 will be adding pulses to the counter 32 at the same time that the counter 32 is counting the output of oscillator 28, the signals appearing on line 57 must be synchronized with the oscillator 28 output so that the add pulses do not occur at the same time that the clock pulses occur. The clock signal output from oscillator 28 on line 62 is an input to add pulses logic 50 and provides a synchronization reference for logic 50.

The block pulses logic 52 is also responsive to the instantaneous count contained in counting means 16 and to the frequency output from the VCO 12 appearing on line 34. For predetermined count configurations of counting means 16, the logic 52 will block clock pulses from the oscillator 28 appearing on line 60 to prevent them from advancing the counter 32. The clock pulses are blocked at a rate determined by the frequency of the VCO 12 output.

The add pulses logic 50 comprises a binary counting means 51 including flip-flops A, B, C and D. The flip-flops in the counting means 51 are interconnected to form a binary counter to count the output pulses from the VCO 12 which are received as a toggle input to flip-flop A on line 34.

The flip-flop A will change state each time a pulse appears on line 34. The flip-flop A is enabled by a signal on line 35 from the VCO 12. The signal on line 35 will be true for all positive thermocouple inputs allowing the flip-flop A to respond to the signal on line 34.

Flip-flop A has a set input from NOR gate 78 and a reset input appearing on line 36. The reset signal on line 36 is generated by the reset flip-flop 22 in FIG. 1 and will reset all the flip-flops in the counting means 51 as shown. The false output of flip-flop A is a toggle input to the flip-flop B. The flip-flop B will toggle, i.e. change state, each time flip-flop A becomes false. In a like manner, the false output of flip-flop B toggles the flip-flop C which in turn toggles the flip-flop D. In this manner, flip-flop A will divide the input signal on line 34 by two. Flip-flop B will divide the toggling frequency of flip-flop A by two and so on. A binary counter containing four binaries interconnected in this fashion therefore will divide a signal input by 16. That is, flip-flop D will become true for each 16 input pulses on line 34.

Associated with the counting means 51 are permutation NOR gates 72, 74, 76, 78, 80, 82, 84, 86, 88, 90, 92, and 94. These permutation gates will alter the counting logic of the counting means 51 to allow it to divide the input on line 34 by any number less than 16.

The inputs to the gates 80, 82, 84, 86, 88, 90, 92 and 94 are from the flip-flops in the counting means 51 and the status signals on cable 38, which indicate the count configuration of counting means 16. The connections between the flip-flops in the counting means 51 and the gates 80 through 94 are not shown in the figure to simplify the drawing.

In appendix II, there are shown six charts. Each chart represents a truth table for the logic states of the flip-flops contained in the counting means 51 for a particular permutation of its count logic. For example, Chart A is the truth table for the divide-by-three permutation of the counting means 51. Charts B, C, D, E and F are the divide-by-four,-five,-seven,-eight and-nine permutations, respectively, of the counting means 51.

Referring again to FIG. 4, the NOR gates 72, 74, 78 and 80 are the gates which permutate the counting means 51 to a divide-by-three counter during the period of time that the counting means 16 is accumulating the first 1,000 pulses. The NOR gates 72, 74 and 82 permutate the counting means 51 to a divide-by-four counter for the second 1,000 pulses accumulated in the counting means 16. The counting means 51 is permutated to a divide-by-five counter for counts 2,000—3,999 in counting means 16 by the NOR gates 72, 76, 78, 84 and 86. The NOR gates 72, 78 and 88 permutate the counting means 51 to a divide by seven counter for accumulated counts 4,000—4,999. The NOR gates 72 and 90 permutate the counting means 51 to a divide-by-eight counter for accumulated counts 5,000—5,999. The NOR gates 74, 76, 78, 92 and 94 permutate the counting means 51 to a divide-by-nine counter for all counts above 6,000. The outputs from the gates 72, 74, 76 and 78 are set inputs to flip-flops D, C, B and A, respectively. Logic gates 72 through 94 permutate the count logic of the counting means 51 to correspond to the truth tables shown in appendix II.

Add pulses logic 50 also includes a synchronization means 99 comprising a NAND gate 96, one-shot multivibrators 98 and 100, and a flip-flop 102.

The synchronization means 99 generates a true signal, an add pulse signal, on line 57 as an input to the NOR gate 58 which generates a false output to advance the time base counter 32. The signal on line 57, the add pulse signal, occurs whenever the flip-flop D becomes one-set and is synchronized with the oscillator 28 output so that it will not interfere with the normal clock pulses from the oscillator 28 passing through the NOR gate 58 to be counted into the time base counter 32.

The synchronization of the add pulse signal on line 57 is attained by referencing the occurrence of the signal to the clock signal output from oscillator 28 on line 62. Clock will set a 60-microsecond one-shot 100 on the positive going edge of that signal, that is at the end of a clock pulse. When one-shot 100 is set, it generates a true input to the NAND gate 96. A second input to NAND gate 96 is the true output of flip-flop D. The false output of flip-flop 102 is a third input to NAND gate 96. The NAND gate 96 will generate a false output when all of its input signals are true. A false output from gate 96 will set one-shot 98 for 10 microseconds. The output of one-shot 98 then is the add pulse signal on line 57 to NOR gate 58. The output of one-shot 98 also sets flip-flop 102. When flip-flop 102 is set by one-shot 98, gate 96 is disabled until flip-flop 102 is reset. Flip-flop D once having been set must again become reset to reset flip-flop 102 before NAND gate 96 will again be enabled. Therefore, one and only one add pulse on line 57 will be added into counter 32 each time flip-flop D is one-set.

Referring to FIG. 5, the operation of the synchronization means 99 can be seen in graphic form. FIG. 5b is the clock signal appearing on line 62 as an input to one-shot 100. FIG. 5d is the output of one-shot 100. Note that the one-shot 100 is set on each positive going edge of clock such as edge 103 seen in FIG. 5b.

FIG. 5f is the output of flip-flop D. The counting means 51 will divide the output of the VCO 12, seen in FIG. 5e, by three for the first 1,000 counts accumulated in the counting means 16. Accordingly, the flip-flop D will be set true every three cycles of the signal shown in FIG. 5e.

FIG. 5g is the 10-microsecond one-shot 98 output which will be true for 10 microseconds following the coincidence of a true output from flip-flop D and a true output from the 60-microsecond one-shot 100.

The pulses appearing in FIG. 5g are the add pulses input on line 57 to the gate 58. It can be seen by comparing these pulses to the clock pulses appearing in FIG. 5a that they occur following the clock pulse. Accordingly, the clock pulses and the add pulses will not occur as simultaneous inputs to the gate 58.

Referring again to FIG. 4, the block pulses logic 52 provides a means for blocking the clock pulses appearing on line 60 from being counted into the time base counter 32. The block pulses logic 52 is responsive to predetermined count configurations in the counting means 16, and will block clock pulses from the oscillator 28 at a rate determined by the frequency of the output of the VCO 12.

The output of the block pulses logic 52 appears on line 53 as an input to the NAND gate 54. Clock pulses appearing on line 60 from the oscillator 28 will pass through the NAND gate 54 as long as the signal on line 53 is true. That is, when the signal on line 53 is true, the output from the NAND gate 54 will become false each time a clock pulse occurs on line 60. As previously described, each time the output from the gate 54 becomes false, the time base counter 32 will be advanced one count configuration. When the signal on line 53 is false, however, the output from the NAND gate 54 will remain true at all times regardless of the signal on line 60. Accordingly, no clock pulses from the oscillator 28 will be counted into the time base counter 32 when the signal on line 53 is false.

The output of the VCO 12, appearing on line 34 as an input to counting means 16, is a one-set input to a flip-flop 140 in the block pulse logic 52. For each cycle of the output of the VCO 12 the flip-flop 140 will be set. The flip-flop 140 has an enable input on line 35 from the VCO 12. This signal will enable the flip-flop 140 to respond to the inputs on line 34 when the VCO 12 output indicates that the thermocouple input to the system is negative. The block pulses logic 52 then is actuated only during negative indicated frequency outputs from the VCO 12.

The true output from the flip-flop 140 is an input to the NAND gate 142. The clock signal on line 62 is AC coupled through a capacitor 141 as a second input to the gate 142. The NAND gate 142 then will generate a false output to a one-shot 144 when the flip-flop 140 is true and the clock signal is making a positive transition. The one-shot 144 will become set for 120 microseconds for a false input from the gate 142.

The period of time for which the one-shot 144 is set is selected so that it has a duration extending somewhat beyond one clock cycle output of the oscillator 28. The output of the one-shot 144 is an input to a pair of NAND gates 138 and 146 and a toggle input to a flip-flop E. A second input to the NAND gate 138 is the clock signal on line 60. The NAND gate 138 will reset the flip-flop 140 when a clock pulse occurs coincident with a true state of the one-shot 144.

The block pulses logic 52 includes a binary counting means 53 comprising flip-flops E, F and G interconnected as a binary counter to divide the toggle input to the flip-flop E by eight. The counting means 53 may be permutated to alter its dividing action by permutation gates 112, 114, 116, 118, 120, 122 and 124. These gates are responsive to the count configuration in the counting means 16 and to the state of the flip-flops E, F and G to permutate the count logic.

Referring to appendix III, there is shown three truth tables, A, B and C. These tables shown how the counting means 53 logic is permutated to mechanize the copper-constantan thermocouple input to the system.

Recall that for the first 1,000 pulses accumulated in the counting means 16 for a negative thermocouple input, the linearization logic 30 blocks two clock pulses from the oscillator 28 for each five pulse inputs from the VCO 12 to the counting means 16. Chart A in appendix III is the truth table for the counting means 53 to accomplish this result.

Chart B is the truth table for the counting means 53 for the second 1,000 pulses accumulated in the counting means 16 where one clock pulse from the oscillator 28 is blocked for each two pulse inputs to the counting means 16.

Chart C is the truth table for the counting means 53 for all count accumulations in the counting means 16 above 2,000 during which time the linearization logic 30 blocks five oscillator 28 pulse outputs for each seven pulse inputs to the counting means 16.

Referring now to FIG. 4, the NOR GATES 118, 112 and 114 permutate the counting logic of the counting means 53 to correspond to the truth table shown in Chart A of appendix III. For example, at the beginning of the sample period, the flip-flops E, F and G are all initialized to a zero state by the reset signal on line 36. The Flip-flop E will be toggled each time the one-shot 144 returns to a normal state following a pulse input on line 34 from the VCO 12. After four pulse inputs to the counting means, the flip-flop G will be set true. Accordingly, the G input to the NOR gate 118 will become false. The second input to the NOR gate 118 will be false during the first 1,000 pulses accumulated by the counting means 16. Accordingly, the gate 118 will have a true output after four pulse inputs to the counting means 53. The output of gate 118 is an input to the gates 112 and 114. These gates will generate an output to set the flip-flops E and F. The flip-flops in the counting means 53 then will all be set true after four pulse inputs to the flip-flop E. The fifth pulse input to the counting means 53 will cause all flip-flops to be set to zero as shown in Chart A. During the first 1,000 counts accumulated in the counting means 16, the counting means 53 will be a five counter, that is, it will recycle every five pulse inputs to flip-flop E.

The true output from flip-flop G is a set input to a block flip-flop 104. Each time the flip-flop G is one-set, it will in turn one-set the flip-flop 104. The block flip-flop 104 will remain set until it is reset by a true output from the NOR gate 126. The true output from flip-flop 104 is an input to NAND gate 146. The gate 146 will have a false output on line 53 to the gate 54 when both of its inputs are true. Accordingly, when the one-shot 144 is true and the flip-flop 104 is true, the signal on line 53 will be false and the clock pulses appearing on line 60 will be prevented from passing through the gate 54 to be counted into the time base counter 32. When either input to gate 146 is false, its output will be true allowing the clock pulses to be added into the time base counter 32.

It can be seen that once the flip-flop 104 is set true, the clock pulse on line 60 will be blocked from the passing through the gate 54 each time a pulse from the VCO 12 appears on line 34 as a set input to the flip-flop 140. For example, assume the flip-flop 104 has been set true by the counting means 53 and a pulse occurs on line 34 to set flip-flop 140, the next positive transition of clock on line 62 will cause gate 142 to one-set the one-shot 144 resulting in a false output from the gate 146 on line 53. The false signal on line 53 will last for 120 microseconds following the clock positive transition. This 120 microsecond period is sufficiently long to block the next clock pulse appearing on line 60.

The block flip-flop 104 is reset by logic gates 126, 128, 130, 132, 134 and 136. For example, during the period of time that counting means 16 is accumulating the first 1,000 counts, the NAND gate 128 will generate a false output each time the flip-flop E is true. The output of the gate 128 is an input to the NOR gate 126 which will generate a true output to reset the flip-flop 104.

Referring now to Chart A in appendix III, it can be seen that the block flip-flop 104 will be set each time the flip-flop G becomes true and will be reset two pulses later when the flip-flop E becomes true. Accordingly, flip-flop 104 will be true for two out of the five counts of the counting means 53.

Note in FIG. 4, that once the flip-flop 104 becomes set, the gate 146 will block a clock pulse only after a pulse input on line 34 sets the flip-flop 140. It should be noted that since the frequency of the pulses on line 34 is low as compared to the frequency of the oscillator 28, there may be several clock pulses occurring on line 60 between pulses occurring on line 34. Even assuming that the flip-flop 104 is true, these clock pulses intermediate the pulses on line 34, will be allowed to pass through the gate 54 with the exception of the clock pulse occurring immediately after a pulse on line 34.

The gate 120 will permutate the logic of the counting means 53 during the second 1,000 counts accumulated by counting means 16 to make it a two-count register as shown in Chart B of appendix III. The counting means 53 will recycle for each two pulse inputs to the block pulses logic 52 on line 34. The flip-flop G will be set every other pulse input, setting the flip-flop 104. The NAND gate 130 will generate a false output each time flip-flop E becomes true. A false output from the gate 130 will cause the gate 126 to generate a true output which resets the block flip-flop 104. The flip-flop 104, then, will be set true every other pulse input on line 34. Therefore, one clock pulse on line 60 will be blocked for every two pulse inputs on line 34.

For all count accumulations in the counting means 16 beyond 2,000, the NOR gates 122 and 124 will permutate the count logic of the counting means 53 to correspond to Chart C in appendix III. It can be seen in Chart C that the counting means 53 is a seven-count register during this interval. The block flip-flop 104 will be set each time the flip-flop G is true and will be reset by the gates 132, 134 and 136. A true output will be generated by the gate 126 to reset the flip-flop 104 each time the flip-flop F and G become false. As seen in Chart C, then, the block flip-flop 104 will be set for five out of the seven count configurations of the counting means 53. Accordingly, five clock pulses will be blocked for each seven pulse inputs on line 34.

Referring to FIG. 6, the time relation between the events occurring in the block pulses logic 52 can be seen.

A typical input on line 34 is shown in FIG. 6d. Each pulse occurring on line 34 will set the flip-flop 140 as shown in FIG. 6e. The 120-microsecond one-shot 144, seen in FIG. 6f, will be set true when the sync flip-flop 140 is true and the clock signal seen in FIG. 6b has a positive going transition. The flip-flop 140 will be reset when the one-shot 144 is true and a clock pulse, FIG. 6a, occurs on line 60. Each time the one-shot 144 returns to its false state, the counting means 53 will be advanced one count configuration.

Assuming that the counting means 16 is accumulating its first 1,000 pulses, the block flip-flop 104, FIG. 6g, will be set after four pulses have occurred on line 34, FIG. 6d. Once the block flip-flop 104 has been set, a clock pulse will be blocked from passing through the gate 54 each time one-shot 144 is set. FIG. 6h shows the inputs to the time base counter 32. Note the two missing pulses, represented by the phantom lines, which coincide with the simultaneous occurrence of the flip-flop 104 being true and the one-shot 144 being true.

AN ALTERNATIVE EMBODIMENT

The base sample time for the system may also be chosen as .6501 seconds, which corresponds to −300.0° F., as seen in FIG. 3. This base sample time selection simplifies the design of the linearization logic 30 in that, as can be seen in FIG. 3, the sample time curve is decreasing from −300.0° F. to +700.0° F. Accordingly, the linearization logic 30 need include only add pulses logic. The block pulses logic, then, would be unnecessary since the sample time is not increased from .6501 seconds.

If a base sample time of .6501 seconds is used, the counting means 16 would be a bidirectional counter which would be set to a count representing −300.0° F. at the beginning of each sample time. Assuming, for example, under these conditions that the input to the system corresponded to +200.0° F., the frequency input to the counting means 16 would be 4.637 kHz. The counting means 16, which would be initially set to −300.0° F., will count down until it reaches a zero count and then would begin to increase its count for the positive temperature portion of the curve. During the first 1,000 pulses accumulated by the counting means 16, the linearization logic 30 would decrease the sample time by .0692 seconds, that is, 692 pulses would be added to time base generating means 32. During the second 1,000 pulses accumulated by the counting means 16 as it decreased from 2,000 pulses to 1,000 pulses, the linearization logic 30 would decrease the sample time by .0515 seconds, that is, it would add 515 pulses to the time base generator 32 and so on.

In this particular embodiment of the present invention the circuitry of the add pulses logic 50 would remain substantially the same but would include additional gating means for permutating the count logic of the counting means 51 to derive the necessary number of pulses to be added into counter 32 for the negative portions of the system input.

APPENDIX I

| A | B | C | D | E |
|---|---|---|---|---|
| Temp., ° | MV=kHz. | Sample time | Linearization sample time | Display |
| 700 | 19.770 | .3540 | .3536 (÷9) | 699.0 |
| 600 | 16.443 | .3649 | .3647 (÷8) | 599.6 |
| 500 | 13.245 | .3775 | .3772 (÷7) | 499.6 |
| 400 | 10.195 | .3923 | .3914 (÷5) | 399.1 |
| 300 | 7.317 | .4100 | .4114 (÷5) | 301.0 |
| 200 | 4.637 | .4314 | .4314 (÷4) | 200.0 |
| 100 | 2.187 | .4572 | .4564 (÷3) | 99.8 |
| 0 | 0 | .4897 | .4897 | 0 |
| −100 | −1.889 | .5294 | .5297 (2/5) | −100.0 |
| −200 | −3.441 | .5809 | .5797 (1/2) | −199.4 |
| −300 | −4.614 | .6501 | .6507 (5/7) | −300.2 |

APPENDIX II

| Pulse Input | Chart A | | | | Chart B | | | | Chart C | | | | Chart D | | | | Chart E | | | | Chart F | | | |
|---|---|---|---|---|---|---|---|---|---|---|---|---|---|---|---|---|---|---|---|---|---|---|---|---|
| | D | C | B | A | D | C | B | A | D | C | B | A | D | C | B | A | D | C | B | A | D | C | B | A |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 0 | 0 | 0 | 1 | 0 | 0 | 0 | 1 | 0 | 0 | 0 | 1 | 0 | 0 | 0 | 1 | 0 | 0 | 0 | 1 | 0 | 0 | 0 | 1 |
| 2 | 1 | 1 | 1 | 1 | 1 | 1 | 1 | 0 | 0 | 0 | 1 | 0 | 0 | 0 | 1 | 0 | 0 | 0 | 1 | 0 | 0 | 0 | 1 | 0 |
| 3 | 0 | 0 | 0 | 0 | 1 | 1 | 1 | 1 | 0 | 0 | 1 | 1 | 0 | 0 | 1 | 1 | 0 | 0 | 1 | 1 | 0 | 0 | 1 | 1 |
| 4 | | | | | 0 | 0 | 0 | 0 | 1 | 1 | 1 | 1 | 1 | 1 | 0 | 1 | 1 | 1 | 0 | 1 | 0 | 1 | 0 | 1 |
| 5 | | | | | | | | | 0 | 0 | 0 | 0 | 1 | 1 | 1 | 0 | 1 | 1 | 0 | 1 | 0 | 1 | 1 | 0 |
| 6 | | | | | | | | | | | | | 1 | 1 | 1 | 1 | 1 | 1 | 1 | 0 | 0 | 1 | 1 | 0 |
| 7 | | | | | | | | | | | | | 0 | 0 | 0 | 0 | 1 | 1 | 1 | 1 | 0 | 1 | 1 | 1 |
| 8 | | | | | | | | | | | | | | | | | 0 | 0 | 0 | 0 | 1 | 1 | 1 | 1 |
| 9 | | | | | | | | | | | | | | | | | | | | | 0 | 0 | 0 | 0 |

APPENDIX III

| Pulse input | Chart A | | | Chart B | | | Chart C | | |
|---|---|---|---|---|---|---|---|---|---|
| | E | F | G | E | F | G | E | F | G |
| 0 | 0 | 0 | 0 | 0 | 0 | 0 | 0 | 0 | 0 |
| 1 | 1 | 0 | 0 | 1 | 1 | 1 | 1 | 0 | 0 |
| 2 | 0 | 1 | 0 | 0 | 0 | 0 | 0 | 1 | 0 |
| 3 | 1 | 1 | 0 | --- | --- | --- | 1 | 1 | 0 |
| 4 | 1 | 1 | 1 | --- | --- | --- | 1 | 0 | 1 |
| 5 | 0 | 0 | 0 | --- | --- | --- | 0 | 1 | 1 |
| 6 | | | | | | | 1 | 1 | 1 |
| 7 | | | | | | | 0 | 0 | 0 |

I claim:

1. An apparatus for digitizing a continuous, nonlinear analogue function having a known characteristic curve comprising:
   a voltage controlled oscillator having a periodic function output with a frequency determined by said analogue function;
   a first counting means;
   a first gating means for applying said periodic function as an input to said counting means when said first gating means is enabled;
   decoding means for generating status signals indicating the count values contained in said first counting means;
   a binary having a first and a second state, said first gating means being enabled when said binary is in said first state;
   a fixed frequency oscillator;
   a second counting means having a fixed count capacity, said second counter generating a stop signal when it reaches its count capacity disabling said first gating means and causing said binary to assume said second state;
   second gating means for applying the output of said fixed frequency oscillator to said second counting means; and
   logic means responsive to said status signals from said decoding means and to the frequency and sign of said periodic function for (i) adding additional pulse inputs into said second counting means, or (ii) blocking pulse inputs into said second counting means from said fixed frequency oscillator, the addition of pulses or blocking of pulses determined as a function of the sign of said periodic function, the rate at which said pulses are added or blocked being determined by the frequency of said periodic function and predetermined count values contained in said first counter.

2. The apparatus as described in claim 1 further including a one-shot multivibrator responsive to said second counter for generating an output pulse having a predetermined duration when said stop signal is generated, said output pulse disabling said first gating means.

3. The apparatus as described in claim 1 further including a display means responsive to the count value contained in said first counting means and to said stop signal for displaying the count value in said first counting means when said stop signal is generated.

4. The apparatus as described in claim 1 wherein said logic means comprises:
   a third counting means having said periodic function as an input for dividing said function by predetermined divisor values and generating corresponding pulse outputs;
   permutation logic responsive to said status signals generated by said decoding means for permutating the counting of said third counting means to determine said divisor values; and
   synchronization means having said third counting means pulse outputs as an input and responsive to said fixed frequency oscillator output for generating an add pulse input to said second gating means when said third counting means generates a pulse output, said add pulse being noncoincident with said fixed frequency oscillator input to said second gating means.

5. The apparatus as described in claim 1 wherein said logic means comprises;
   synchronization means having said periodic function as an input and responsive to said fixed frequency oscillator output for generating count pulses at a frequency corresponding to the frequency of said periodic function input, each said count pulse generated in a predetermined phase relationship with said fixed frequency oscillator output and having a duration exceeding but less than twice the period of said fixed frequency oscillator output;
   third counting means for dividing said count pulses by predetermined divisor values and generating corresponding outputs;
   permutation logic responsive to said status signals generated by said decoding means for permutating the counting of said third counting means to determine said divisor values;
   a second binary having a first and second state coupled to said third counting means, said binary being set to said first state for each output generated by said third counting means;
   reset logic means responsive to said third counting means and to said status signals operated by said decoding means for resetting said second binary to said second state a predetermined number of count pulses after said second binary assumed said first state, said predetermined number of count pulses being a function of said status signals; and
   third gating means responsive to said count pulses and said second binary for disabling said second gating means when said count pulse is coincident with said second binary's first state.